United States Patent [19]

Rosenthal et al.

[11] 4,357,173

[45] Nov. 2, 1982

[54] LENS CLEANING AND POLISHING METHOD

[75] Inventors: Perry Rosenthal, Brookline; Louis Mager, Waltham, both of Mass.

[73] Assignee: Polymer Technology Corporation, Wilmington, Mass.

[21] Appl. No.: 197,273

[22] Filed: Oct. 15, 1980

[51] Int. Cl.³ .............................................. B08B 11/02
[52] U.S. Cl. ......................................... 134/6; 134/21; 206/5.1
[58] Field of Search ...................... 134/6, 21; 206/5.1; 15/214, 233, 118

[56] References Cited

U.S. PATENT DOCUMENTS 1,712,325  5/1929  Brandfon .............................. 15/214
4,269,306  5/1981  Feniger ............................ 15/214 X

FOREIGN PATENT DOCUMENTS 1197161  7/1970  United Kingdom ................ 206/5.1

*Primary Examiner*—Richard V. Fisher
*Attorney, Agent, or Firm*—Wolf, Greenfield & Sacks

[57] ABSTRACT

A lens cleaning and polishing method utilizes a stretcher frame mounting a soft pliable lens cleaning and polishing cloth. A hand held suction handle is used to hold one side of a contact lens against the cloth. When the concave side is held against the cloth, the cloth is tented with the finger of the user or a similar shaped object to have the cloth conform to the concave surface. When the convex surface is to be polished, it is placed directly against the cloth and pressure applied. In each case, the cloth covers a substantial portion of the curved surface. The cloth is wetted with a polishing cleaning material and the lens is rubbed with respect to the cloth in order to polish and clean the lens rapidly and efficiently in a hand operation.

4 Claims, 4 Drawing Figures

U.S. Patent
Nov. 2, 1982
4,357,173
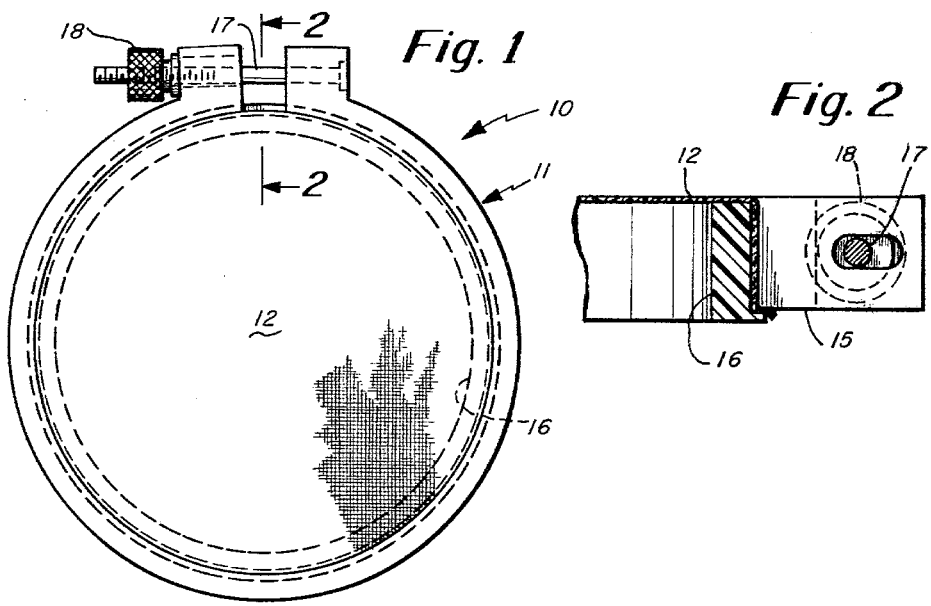
Fig. 1
Fig. 2
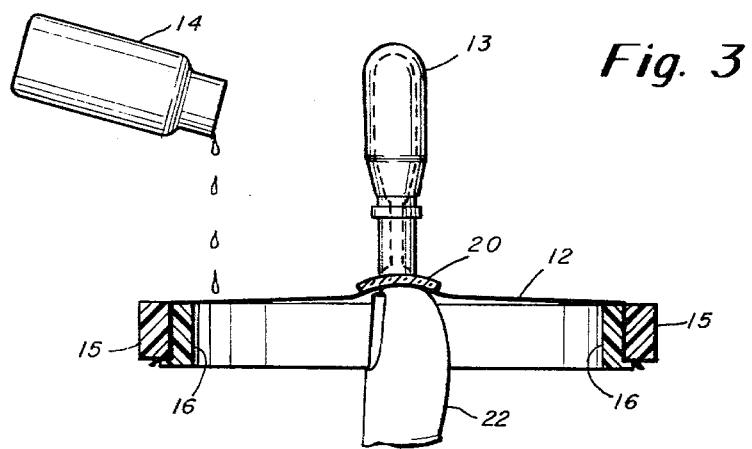
Fig. 3
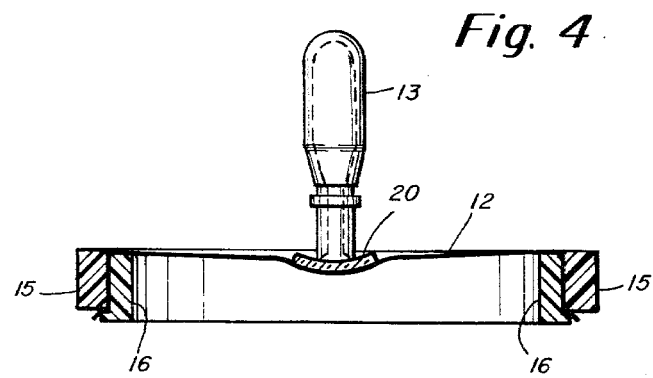
Fig. 4

1

LENS CLEANING AND POLISHING METHOD

BACKGROUND OF THE INVENTION

Hard contact lens have come into increasing use in recent years. After wearing of a hard lens for six months or more by an individual, the lens surfaces often become encrusted and/or scratched. The normal procedure is for the wearer to bring the lens to a contact lens fitter for polishing. Normally such lenses are not polished by the practitioner but are sent to the manufacturer for cleaning and repolishing. Because of the paperwork need to prepared the lens for shipment, its delivery to a laboratory and return to practioner after polishing, considerable time may elapse before the patient can resume wearing the lens again. Since many hard contact lens wearers no long have a pair of spectacles that provide satisfactory vision, this represents a significant handicap. Furthermore, this interruption in contact lens wearing may require a gradual readaption to the lens.

The fitter of the lens and the manufacturer carry out the polishing and cleaning procedure as a service which provides little or no profit to them because of the time and costs involved. Thus, fitters may tend to avoid polishing contact lenses when needed because of the inconvenience to practioner, patient, and manufacturer. When one considers that there are probably about ten million hard contact lens wearers in the United States, and that each wearer should have a cleaning each six months or so, the problems associated with their inadequate cleaning and polishing are seen to be large.

SUMMARY OF THE INVENTION

It is an object of this invention to provide an inexpensive and simply constructed apparatus for the cleaning and polishing of hard contact lens.

It is another object of this invention to provide an apparatus which can be marketed in kit form containing a contact lens holder as well as a polishing surface which allows manual operation to expeditiously and efficiently clean and polish hard contact lenses.

Still another object of this invention is to provide a method of cleaning hard contact lens which method can be carried out by hand, in short periods of time. Still another object of this invention is to provide a method in accordance with the preceding object which method can be carried out by relatively unskilled persons at low cost.

According to the invention, a hard contact lens polishing and cleaning apparatus for permitting rapid and efficient cleaning and polishing of contact lens by hand has a soft yieldable contact lens cleaning and polishing cloth. The cloth is surrounded by a support frame which mounts the cloth about its edges so as to provide an exposed polishing surface. The cloth allows tenting by finger pressure to provide a cloth polishing surface conforming to the curvature of the concave surface of the lens or tenting of the cloth by application of a convex lens surface thereto with the closely conforming to and wiping the surfaces when tented against the surfaces. The apparatus further comprises a suction device for gripping a hard contact lens on one side while the other side is polished and/or cleaned in the apparatus of this invention. Preferably, a polishing material is used on the cloth to provide polishing and cleaning action to a contact lens surface. In the preferred embodiment, the gripping holder used to hold the lens and the frame with attached cloth are capable of being hand held to allow a hand polishing and cleaning operation.

According to the method of this invention, a contact lens is cleaned and polished by securing the convex surface of the lens with a stiff suction gripping holder, tenting a soft yieldable cloth held in the frame by applying point pressure to one side thereof to provide a convex polishing surface for polishing the lens and rubbing the concave lens surface with respect to the convex polishing surface after first applying a polishing material to polish and/or clean the concave surface. In the reverse operation where the convex surface is to be cleaned, the conclave surface is gripped by a suction gripping holder and the convex surface is moved into the polishing surface and rubbing then carried out as before.

It is a feature of this invention that the apparatus can be constructed of inexpensive materials and can be operated to carry out the method by relatively unskilled personnel. The time required for polishing is minimal. Polishing and/or cleaning can be carried out in the fitters office while the wearer waits thus avoiding the inconvenience of being without the lens for any sustained period of time.

BRIEF DESCRIPTION OF THE DRAWINGS

The above and other objects, features, and advantages of the present invention will be better understood from a reading of the following specification in conjunction with the drawings in which:

FIG. 1 is a top view of a preferred embodiment of this invention;

FIG. 2 is a cross-sectional view through line 2—2 thereof;

FIG. 3 is a view showing a step in cleaning and polishing using the apparatus of FIG. 1; and, FIG. 4 is another side view showing still another step in the method of using the apparatus of FIG. 1 in a cleaning and polishing procedure.

DESCRIPTION OF PREFERRED EMBODIMENT

According to the invention, a polishing and cleaning apparatus is generally indicated at 10 in FIG. 1 and comprises a frame 11, a cloth 12, a holder 13, and a polishing material 14.

The frame 11 is a stretcher frame having an outer hoop 15 and an inner hoop 16 with the outer hoop being adjustable to tightly grip the outer surface of the inner hoop by an adjustment screw and nut arrangement 17, 18 respectively. In the preferred embodiment, the hoop is adapted to be hand held in one hand allowing it to be rubbed with respect to a lens which is hand held in the other hand of the user. Thus the hoop of the preferred embodiment is formed of plastic and has an outer diameter of about five inches. The exact dimensions of the hoop can vary greatly but ordinarily will be no less then three inches in inner diameter and no more than about twelve inches in inner diameter. In all cases it is only necessary that the frame provide a stretching device for tightly stretching a soft pliable cloth as will be described. The frame need not be circular although circular frames are inexpensive and are preferred as are plastic frames.

The polishing cloth 12 can be any conventional polishing cloth ordinarily used for cleaning and polishing contact lens. Velveteen provides a soft cotton-like fabric with a soft surface of cleaning and polishing hard contact lens. Such material is well known in the cleaning and polishing art for contact lens. In all cases the material is soft and pliable having some degree of resiliency so that it can be stretched in the frame and tented by finger or lens pressure.

The cloth is preferably cut to a circular form and can be firmly held between the hoops as best shown in FIG. 2. The cloth is held by friction being pressed between by the outer and inner hoops 15 and 16 much like sewing hoops are used. In some cases the hoops need not have the screw 17 and nut 18 with merely pressure rings used as known for holding needlepoint materials. In all cases the cloth material which can be of synthetic or natural fibers or mixtures thereof, is sufficient for polishing and cleaning purposes, preferably having great resiliency and pliability even when wet.

The hand holder 13 is preferably a suction device of the type known in the art. Such devices are available under the trademark STRONGHOLD as contact lens suction cup holder devices sold of R.F. Products, Inc., of Evergreen, Colo. As known, the holder will grip either the convex or concave surface of a contact lens as shown for example in FIG. 3 at 20 so as to enable one hand of a user to positively hold the lens even when rubbed in a polishing operation. Any suction device known in the art for holding a lens can be used in the apparatus of this invention.

The liquid polishing material 14 is preferably stored in a plastic bottle and can be any known cleaning and polishing materials. Cleaning and polishing material sold under THE BOSTON LENS trademark, a product of Polymer Technology Corporation of Wilmington, Mass. is preferred for use. Such cleaning and polishing materials contain a surface active agent, an inorganic abrasive and thus can act to both polish and clean. Polishing as used in this application is meant to include thorough cleaning of a lens, with removal of minor superficial scratches, without changing the power of the lens significantly.

The apparatus 10 which can be supplied in a kit form containing the frame, cloth, holder and polishing material or any combination of these components, is used in a hand method for cleaning and/or polishing.

For example, as shown in FIG. 3 the suction holder 13 can be applied by one hand of the user to a contact lens 20. The contact lens 20 can then be positioned near a polishing surface shown adjacent the lens in FIG. 3. The polishing surface is provided by the cloth 12 being depressed or tented by a finger 22 of a user. The finger 22 is preferably on the hand of the user with the other hand gripping the frame 11. Polishing is accomplished by rubbing the lens 20 with respect to the tented polishing surface provided by the holder after first having wet the cloth with the cleaning and polishing material. Just a minute or two of rubbing under normal finger pressure can thoroughly clean a plastic contact lens efficiently and conveniently. Polishing and/or cleaning can be accomplished as desired.

After one surface of the lens is cleaned, the lens can be reversed as shown in FIG. 4. The holder is applied, as for examle to the concave surface, and the lens pressed into the cloth to tent it in the opposite direction, while it is wet, and rubbing again carried out.

It is an important feature of the invention that an alternative to commercial machine operated polishing and/or cleaning be provided. Hand pressures and rubbing are sufficient to effectively, conveniently and simply clean and/or polish contact lens. The contact lens can be a conventional plastic contact lens although lens of various kinds and types can be cleaned using the apparatus of this invention.

While specific embodiments of this invention have been shown and described, many variations are possible. The size of the frame and vary greatly as can the size and type of the polishing cloth used. Similarly various cleaning and polishing liquids or powders can be used with the polishing cloth of this invention. While hand operations are preferred, in some cases the frame and/or suction gripper can be stand or otherwise mounted. In all cases it is preferred that manual rubbing and polishing power be supplied in a simplified, convenient and effective method of cleaning and/or polishing contact lens.

What is claimed is:

1. A method of cleaning and/or polishing a contact lens having a convex surface and a concave surface, said method comprising,
    holding said convex surface of said lens with a suction gripping holder,
    tenting a soft, yieldable cloth stretched substantially flat in a frame by applying point pressure to one side thereof to provide a convex polishing surface for polishing said lens,
    and rubbing said concave lens surface with respect to said convex polishing surface after first applying a polishing material and thereby polishing said concave lens surface.

2. A method in accordance with the method in claim 1 and further comprising positioning said suction gripping holder on said cleaned concave surface of said lens and engaging said convex surface of said lens with said yieldable cloth to clean said convex surface of said lens by hand rubbing with respect to said cloth.

3. A method of cleaning and polishing a contact lens having a convex surface and an opposed concave surface comprising,
    holding said concave surface of said lens with a suction gripping holder,
    tenting a soft, yieldable cloth stretched substantially flat in a frame by moving said convex surface of said lens into said cloth to tent said cloth,
    and rubbing said tented cloth with respect to said convex surface to clean and/or polish said surface.

4. A method in accordance with the method of claim 3 wherein said cloth is wet with a cleaning and/or polishing material.

* * * * *